United States Patent
Donato

[15] 3,702,514
[45] Nov. 14, 1972

[54] FISHING ROD LINE GUIDE AND MOUNTING

[72] Inventor: Thomas C. Donato, Route 6 Box 2090, Lakeland, Fla. 33801

[22] Filed: April 24, 1970

[21] Appl. No.: 31,579

[52] U.S. Cl. .................................................. 43/24
[51] Int. Cl. ........................................... A01k 87/04
[58] Field of Search .......................................... 43/24

[56] References Cited

UNITED STATES PATENTS

| | | |
|---|---|---|
| 3,117,388 | 1/1964 | Clarke ........................... 43/24 |
| 2,365,414 | 12/1944 | Kruse ......................... 43/24 X |

FOREIGN PATENTS OR APPLICATIONS

| | | |
|---|---|---|
| 1,377,264 | 9/1964 | France ............................ 43/24 |
| 313,692 | 8/1969 | Sweden .......................... 43/24 |

*Primary Examiner*—Russell R. Kinsey
*Assistant Examiner*—Daniel J. Leach

[57] ABSTRACT

A replaceable fishing rod line guide and mounting which permits broken or worn line guides of similar manufacture to be quickly and easily replaced, either in the field or at home. The device comprises four resilient wire legs which are set into a rectangular recess in the body of a fishing rod and support a line guide thereon. The legs are locked in place in the recess by a slotted cylindrical locking ring which encircles the rod between the legs with the slot positioned away from the recess but which is rotatable around the rod to align the slot with the recess for removal of the legs therefrom.

5 Claims, 3 Drawing Figures

PATENTED NOV 14 1972

3,702,514

INVENTOR:
Thomas C. Donato

FISHING ROD LINE GUIDE AND MOUNTING

The invention comprises three principal parts, namely, the mounting which is set into a rectangular recess in the body of the fishing rod; the spring actioned line guide; and the cylindrical line guide locking ring.

The mounting referred to is of such configuration that it will receive the four resilient wire supporting legs of a line guide which are thereupon locked in place on the body of the fishing rod by a slotted cylindrical locking ring. By rotation and positioning of the slotted locking ring and application of manual squeez-ing pressure to the supporting legs of the line guide, the line guide may be pulled out of the mounting and similarly a new line guide inserted. The new line guide is again locked into position by rotation of the slotted locking ring.

This invention relates to a replaceable fishing rod line guide for use on rods made of tubular glass, solid glass, or other non-metallic or metallic material or combination thereof.

The invention permits the quick and easy replacement of worn or broken line guides of similar manufacture and replacement requires no special tools or skills on the part of the fisherman. The invention also eliminates the necessity of securing the line guides to the body of the fishing rod by nylon guide wraps as is the common practice.

The applicability of the invention will become apparent when viewed in the accompanying drawings, wherein.

Figure 1:
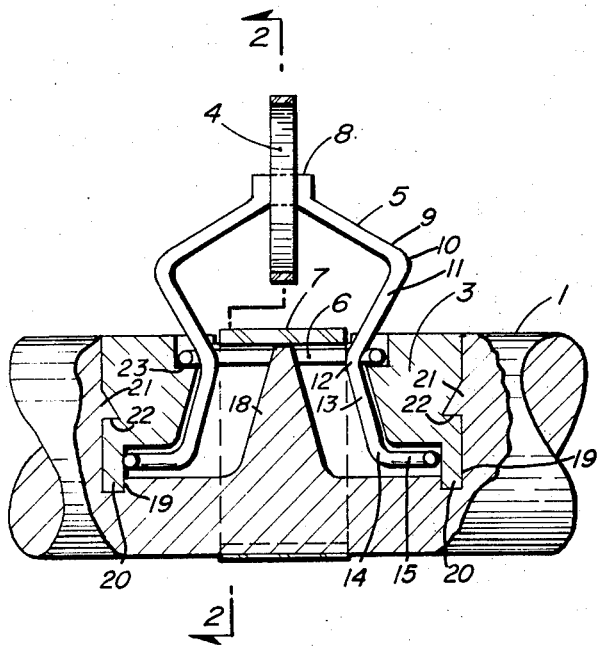
FIG. 1 is a cutaway section of a fishing rod exposing the invention with the line guide shown in a locked position.

Referring now in more detail to my invention, reference is made to the accompanying drawings. The invention comprises three principal parts, namely, the mountings 3 which are set into a cast or pre-cut rectangular recess in the body of the fishing rod 1 during the manufacturing process. The principal object of the mountings is to form a recess for receiving the four supporting legs 5 of the line guide 4 within the body of the fishing rod. The configuration of the mountings 3 shown in FIG. 1 represents one alternative. The recess in the rod is cut about two thirds of the way through the rod and is substanially divided into two parts by a block member 18 upstanding from the base of the recess. At each end of the recess is a notch 19. The mountings 3 are disposed in the recess and each has a downwardly extending tongue 20 disposed in a corresponding notch 19 to space the underside of the mounting 3 from the base of the recess and provide oppositely directed longitudinal cavities. At each end of the recess a spur 21 protrudes into the recess to be received in a correspondingly shaped notch 22 in the mountings 3. It is not intended to disallow other types or methods of accommodating the line guide supporting legs by either providing mountings with different configurations or casting or pre-cutting different recess configurations within the body of the fishing rod. The most practical and economical configuration of recess to accommodate the supporting legs 5 will depend upon the specific manufacturing process and is left to the discretion of the manufacturer.

Figure 2:
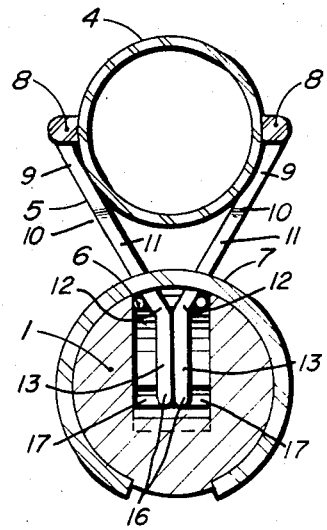
FIG. 2 is a transverse cross-section of the invention taken at line 2—2 of FIG. 1, showing the line guide in a locked position.
Figure 3:
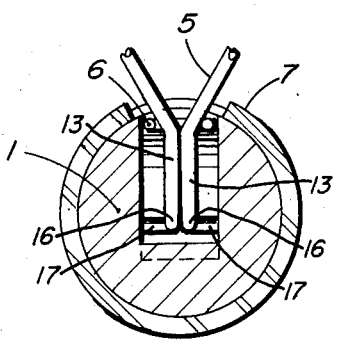
FIG. 3 is a partial transverse cross-section of the invention taken at line 2—2 of FIG. 1, showing the line guide in an open (pull-out) position.

The circular line guide 4 is supported a fixed distance above, and perpendicular to the surface of the fishing rod by four resilient wire supporting legs 5. Two supporting legs on either side of the circular line guide are suitably joined at their upper ends to the line guide, to form two opposite and diametrically opposed support portions 8 on the outer circumference of the line guide. Looking toward the side of the rod, as in FIG. 1, the legs 5 on opposite sides of the guide ring having a first portion 9 diverging downwardly from the support portions 8, each leg then being bent inwardly at 10 at approximately one third its length to form a second portion 11 forming a substantially right angle therebetween facing inwardly toward the line guide. Each leg has an outward bend at 12 at an obtuse angle to form a third portion 13, another outward bend at 14 to form a fourth portion 15 extending outwardly and parallel to the length of the rod, and a bend at 16 to form a transversely extending end portion 17. As shown in FIG. 2, portions 9 and 11 of each pair of legs 5 converge downwardly from the support portions 8 on diametrically opposite sides of the guide ring to adjacent and parallel third portions 13 which extend into the recess provided by mountings 3. A rigid wire catch loop 6 circles and is confined in the bend between the second and third portions of all four supporting legs and when the line guide is inserted within the recess formed by the mountings 3, the wire catch loop 6 will seat horizontally on a recessed shoulder 23 cut into the mounting and will position itself just beneath the surface of the fishing rod.

A cylindrical locking ring 7 with a longitudinal slot, forming an opening in the ring slightly wider than the width of the mountings 3 and extending the entire length of the locking ring, will be positioned around the body of the fishing rod and will be of such diameter to allow manual rotation of the locking ring around the centerline axis of the rod and passage of the ring between the line guide supporting legs. The rotating locking ring 7 will travel snugly within a pre-cut groove on the surface of the fishing rod which will be substantially the same diameter as the locking ring. The depth of the groove will be approximately half the wall thickness of the locking ring.

By manually rotating the locking ring to a position where the open slot is directly above the line guide mounting recess, it is possible to remove the line guide by taking the supporting legs between one's fingers and squeezing the legs toward each other. The resilient wire legs will bend toward each other with the bottom of the legs clearing the recess into which they were inserted. By then pulling straight up, the line guide can be removed. A new line guide can similarly be inserted by reversing the procedure. Rotating the locking ring to a position where the open slot is moved past the mounting recess thereby covering the recess and catch loop 6 with the locking ring wall, the new line guide is now locked into position.

The line guide, supporting legs, catch loop and locking ring may be manufactured of chromed stainless steel, tungsten carbide or other corrosion resistant material.

What I now claim:

1. In a fishing rod line guide and mounting, the combination of a fishing rod and a replaceable line guide supported by resilient wire legs, a recess formed in the body of said rod, a block member upstanding from the base of said recess, a notch formed at each end of the recess base and a spur protruding from each recess end wall, a pair of mountings fixedly secured in said recess with each mounting having a notch in one wall shaped to engage the said spur therein and a downwardly directed tongue disposed in a recess notch to space the underside of said mounting from said recess base and provide a longitudinally extending cavity, a pair of said legs extending from each side of said line guide and being insertable into said recess, the ends of said legs being bent outwardly to be engaged in said cavities, a cylindrical locking ring having a longitudinal slot therein wider than the width of said recess and circling said rod at said block member and being rotatable thereon between said legs to position said slot away from the recess to lock the legs therein and aligned with said recess for removal of said legs therefrom.

2. A replaceable line guide as described in claim 1 wherein said line guide is supported a fixed distance above and perpendicular to the surface of said fishing rod, each pair of said supporting legs suitably joined at their upper ends at two diametrically opposed supporting points on the circumference of said line guide.

3. A replaceable line guide as described in claim 1 wherein each leg extends away from said line guide and is bent at approximately one third its length inwardly toward the line guide and then bent outwardly away from the line guide, a wire catch loop disposed about all said legs at said outward bends, recessed shoulders provided by said mountings, said loop resting on said shoulders when said legs are in said recess.

4. A replaceable line guide as described in claim 1 wherein said locking ring is of a diameter to permit manual rotation of the ring around the axis of said fishing rod, said locking ring rotating snugly within a groove precut or cast into the surface of said fishing rod.

5. A replaceable line guide as described in claim 1, said line guide being manufactured of corrosion resistant metal or alloy.

* * * * *